F. ROMO, Jr.
HOT PLATE LIFTER.
APPLICATION FILED JUNE 12, 1920.
1,389,102.
Patented Aug. 30, 1921.
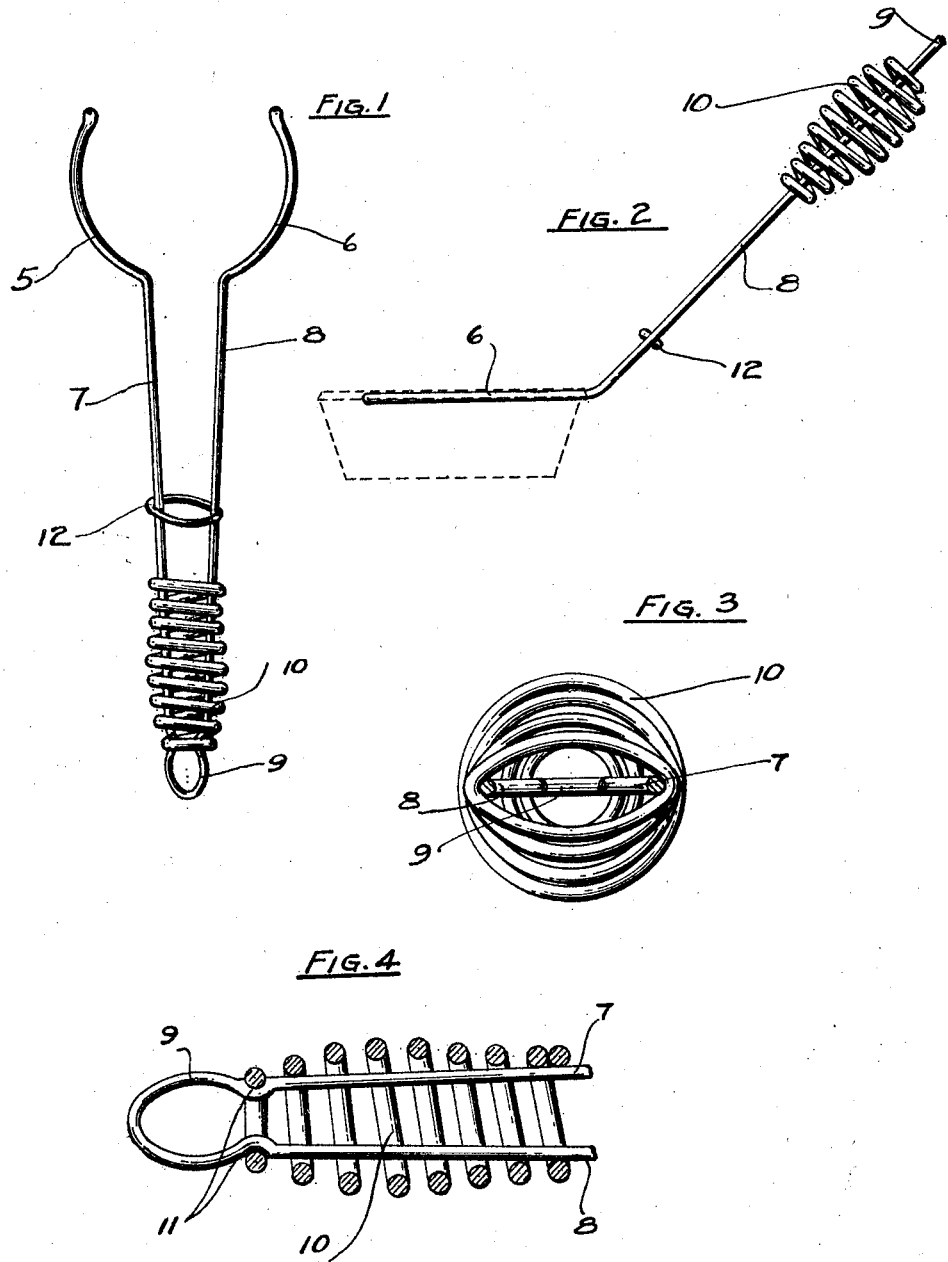
INVENTOR:
F. ROMO, JR.
ATTORNEY

UNITED STATES PATENT OFFICE.

FRANK ROMO, JR., OF HILO, TERRITORY OF HAWAII.

HOT-PLATE LIFTER.

1,389,102.   Specification of Letters Patent.   Patented Aug. 30, 1921.

Application filed June 12, 1920. Serial No. 388,498.

*To all whom it may concern:*

Be it known that I, FRANK ROMO, Jr., a citizen of United States, residing at Hilo, in the county of Hawaii, Territory of Hawaii, have invented certain new and useful Improvements in Hot-Plate Lifters; and I do hereby declare the following to be a full, clear, and exact description of the invention, such as will enable other skilled in the art to which it appertains to make and use the same.

This invention relates to culinary implements and more particularly to what is known as a hot plate lifter such as is employed for handling hot plates, pans and similar articles. The object of the invention is to provide an improved structure that will not only efficiently grasp and hold the article to be lifted, but which will be absolutely durable and which furthermore by reason of its structure, may be manufactured at a low figure.

Figure 1 is a plan view of the implement.

Fig. 2 is a side elevation, showing in dotted lines the position of a pan held therein.

Fig. 3 is a transverse section through the handle, with the grip in end elevation.

Fig. 4 is a section taken longitudinally through the grip with the sides of the handle at the corresponding end, in plan view.

Referring to the drawings, the present plate lifter comprises arcuate jaws 5 and 6, curved in a common plane and formed of a spring wire which also includes the handle sides 7 and 8 that converge in a direction away from the jaws and terminate in the loop-shaped bight portion 9, the transverse diameter of which is greater than the degree of minimum separation of the handle sides. This bight constituting loop 9 serves as an eye through the medium of which the implement may be hung up and serves also to prevent movement of the grip 10 rearwardly upon the handle.

Upon reference to Fig. 4, it will be noted that there are concavities 11 at the points of connection of the handle sides 7 and 8 with the loop 9, and in these concavities is seated the corresponding endmost convolution of the wire helix that constitutes the grip 10. The convolutions of the helix gradually increase in diameter in the direction of the jaws and then gradually decrease in diameter in the same direction and each is of a single diameter until near the jaw end of the grip where the convolutions are elliptical with their major axes in the plane of the handle sides 7 and 8 that are closely embraced by such convolutions but in which the handle sides have movement toward and away from each other. These elliptical convolutions thus form guides to insure the movement of the handle sides with the jaws 5 and 6 in single planes, respectively and they serve furthermore to maintain the curved jaws always in a common plane irrespective of the spacing of the jaws.

It will be noted upon reference to Fig. 2 of the drawings that the plane of the jaws 5 and 6 is different from the plane of the handle sides 7 and 8, being at an obtuse angle thereto.

To hold the handle sides with the jaws in mutual gripping relation, an elliptical slide 12 is mounted upon the handle sides and when moved in the direction of their divergence, serves to draw the jaws toward each other, the divergence of the handle sides being at an angle that provide against the slide moving in the direction of their convergence, when released.

What is claimed is:

1. A plate lifter comprising spaced jaws, convergent handle members and a loop connecting the handle members, and a grip consisting of a wire helix closely embracing the handle members adjacent the loop, the opposite end of the helix being elliptical in cross section with its major axes in the plane of the handle sides which latter diverge from the grip in the direction of the jaws.

2. A plate lifter including jaws, handle sides that converge away from the jaws and a loop connecting the convergent ends of the handle sides, all formed integral, the handle sides adjacent the loop being recessed, a grip consisting of a helix having one terminal convolution snugly seated in the recesses and having its opposite terminal convolution elliptical with its major axes in the plane of the handle sides which handle sides are movable toward and away from each other within the confines of said elliptical convolution and means carried by the handle sides for holding the jaws in gripping relation.

In testimony whereof, I affix my signature, in the presence of two witnesses.

FRANK ROMO, JR.

Witnesses:
PETER SILVA,
D. G. CONEA.